Patented Apr. 6, 1937

2,075,846

UNITED STATES PATENT OFFICE 2,075,846

LAXATIVE AUXILIARY FOOD FLAKES AND PROCESS OF MAKING SAME

Thomas W. Halliday, Los Angeles, Calif.

No Drawing. Application August 19, 1932, Serial No. 629,491

14 Claims. (Cl. 167—56)

The present invention relates to flaked laxative auxiliary food products and methods of making the same, and more particularly to flaked products prepared from seeds commonly known as psyllium or seeds promoting similar physiological action such as *Plantago psyllium*, *Plantago ispaghula*, *Lallernantia royaleana* and the like.

The object of this invention is to provide a product of the above kind wherein the tough outer coating or hull of the seed is broken up and rendered non-irritating to the intestinal tract; to provide a product that is easy to consume either alone or mixed with other food products; and to incorporate in the product flavoring materials to render it more pleasing to the taste and, for indicated cases, to include phenolphthalein or similar non-habit forming substances.

By way of illustration, I shall describe my invention as applied to the treatment of *Plantago psyllium* seeds which I preferably employ in making my auxiliary food flakes. *Plantago psyllium* seeds are small, hard, oblong seeds about 1 mm. wide by 2 mm. long and resemble fleas from which the Greeks named them. The outer shell or hull is comparatively thick and tough. The inner portion of the seed or endosperm consists of a cellular structure made up of minute cells. When a seed is placed in water a mucilaginous or gelatinous material exudes from the outer walls. In the presence of sufficient moisture this gelatinous material will produce a volume of thick, viscous substance many times greater than the bulk of the original seed. This gelatinous material is found to be of particular benefit in promoting elimination from the intestines. When psyllium seeds are taken in their natural state the sharp hulls have been known to produce irritation in the intestinal tract. The gelatinous substance with which the seeds surround themselves in the presence of moisture may become separated in their passage thru the intestines thus exposing the sharp seeds. There is a marked tendency for these sharp seeds to pack in pockets or folds of the intestinal tract and become a source of irritation and distress. By crushing the seeds into thin flakes of relatively large area, say, three to five millimeters diameter, the tough outer hull is broken up and thinned out to such an extent its small and pliant particles pass thru the intestinal tract without irritation. While the seeds are about as attractive in appearance and as difficult to handle as the proverbial flea from which they are named, the flakes readily lend themselves to human consumption. They may be suspended in water and readily swallowed, mixed with other foods and eaten with practically no indication of their presence or they may be eaten without any other aids, this is especially true in flakes that have been flavored.

With the above objects in view, my invention, stated in general terms, includes determining the moisture content and tempering the seeds, if necessary, and adding part of the flavoring, if desired, at this time, then passing the seeds thru differential rolls to break up the hulls and to produce flakes of comparatively large area, adding the balance of the flavoring materials, and drying at a moderate temperature.

As an illustrative example of my process, I first determine the moisture content of the seeds by the usual method. I have found that the psyllium seeds obtained from the various sources of supply usually have a moisture content of from ten to fifteen percent. To prepare the flakes the seeds must have a sufficient moisture content so they will not break up in the rolls and yet not contain enough moisture so as to cause the gelatinous material to exude. Where salt, sugar, malt syrup or similar flavoring materials are to be added it is desirable, as will be shown later, to have a relatively high moisture content in the seeds when they are flaked. I have found that by adding the liquid used to moisten the seeds very slowly and stirring or agitating, or by adding a portion at a time, stirring until the moisture is thoroughly disseminated thru the mass and letting the mixture stand for from thirty minutes to an hour between the addition of each portion that a moisture content of about 30% can be given the seeds without freeing their gelatinous content and causing them to stick together. When the flakes are prepared for diabetic and similar conditions and sugars and the like can not be used in flavoring I prefer an initial moisture content of about fifteen percent. It is obvious that when the raw material happens to carry about fifteen percent moisture that no tempering is necessary. When it is desired to incorporate salt, sugar, malt sugar and the like in the finished product I prefer a moisture content of about twenty five percent. As an example of tempering so as to avoid bringing out the gelatinous content to an objectionable degree I will assume 100 pounds of seed running 13 percent moisture and bring it up to 25 percent moisture. This means, for each 100 pounds initial, we must add 16 pounds of water or other liquid. If this amount of liquid were all added at once, it would be very difficult to prevent portions of the seeds from gumming up. However, if we spray about half of the liquid on the seeds while agitating them for a few minutes, and let them stand for from half an hour to an hour, or until the moisture is absorbed by the seeds, no difficulty will be encountered. The balance of the moisture may be added in amounts of about four pounds each in two more successive steps as outlined for the first portion. If even greater moisture content should be desired the final additions should be made in quantities of not over one or two pounds of liquid at a time. If salt is desired in the flavoring of the flakes it may be added to the water used in tempering. I prefer about two pounds of salt to each 100 pounds of seeds.

When the seeds are thoroughly tempered they are passed thru flaking rolls. These rolls are preferably smooth and run at a differential speed. I have found that with one roll turning about fifty percent faster than the other a very satisfactory flake is obtained.

There are several ways of incorporating the flavoring materials with the flakes. I prefer to use what might be termed a dry method. In passing the flakes thru the rolls they are heated to some extent, and when the moisture content is high—20 to 30 percent—they come out in a warm and moist or humid condition. Flavoring materials such as salt, sugar, malt sugar and the like may be added and, if in a finely divided or powdered state, will readily adhere to the flakes. If ordinary sugar or dextrose is used, I prefer about twenty pounds of sugar to 100 pounds of flakes. Another method of introducing the flavoring materials that I have employed is to make the flakes from seeds with a moisture content of around fifteen percent, mix the finely powdered flavoring materials with the flakes and place the mixture in a steam bath at a temperature of about 200° F. (stirring constantly or at frequent intervals to prevent the flakes from sticking together and to insure uniform moistening) until the flavoring materials are absorbed by or adhere firmly to the flakes. When desired, for indicated cases, phenolphthalein may be added and it is readily incorporated with the flakes by mixing it in a finely powdered state with the other flavoring materials. I have used other means of adding flavoring materials such as spraying hot solutions of salt, sugar, malt sugar and the like to thin layers of flakes but since similarity of purpose is obvious and the mode of application evident, detailed description is not necessary.

After the flakes have been flavored they are then dried to give them a pleasant crispy texture and to insure keeping. In drying the flakes it is important that too high temperatures be not employed as there is danger of breaking down the gelatinous forming structure. I prefer a temperature of around 200° F. My tests show that while moderate temperatures up to 210 to 215° F. have no deleterious action that a temperature of 250° F. will seriously impair the gelatinous forming properties of the flakes in a few minutes.

While I have herein specifically described my process as employed in the treatment of *Plantago psyllium* it will be readily understood by those skilled in the art that it is equally applicable in the treatment of similar gelatinous forming seeds used for promoting similar physiological action, and some of the steps may in some cases be omitted.

What I claim is:

1. A method of preparing gelatinous forming seeds for physiological consumption, including the steps of tempering the seeds to a predetermined moisture content and subjecting the seeds to the action of crushing rolls to produce flakes, and then drying the flakes at a temperature below that at which the gelatinous forming property of the seeds is impaired.

2. A method of preparing gelatinous forming seeds for physiological consumption, including the steps of tempering the seeds to a predetermined moisture content, subjecting the seeds to the action of crushing rolls to produce flakes having a surface area of from three to fifteen times greater than the seeds, and then drying the flakes at a temperature below that at which the gelatinous forming property of the seeds is impaired.

3. A method of preparing gelatinous forming seeds for physiological consumption, including the steps of tempering the seeds to a predetermined moisture content, subjecting the seeds to the action of crushing rolls to produce flakes, and then drying the flakes at a temperature below 250° F.

4. A method of preparing psyllium seeds for physiological consumption, including the steps of tempering the psyllium seeds to a predetermined moisture content, subjecting the seeds to the action of crushing rolls to produce flakes, and then drying the seeds at a temperature below that at which the gelatinous forming property of the psyllium seeds is impaired.

5. A process of preparing psyllium seeds for physiological consumption, which consists in tempering the seeds by adding water thereto to increase the moisture content of the seeds without bringing out the gelatinous content of the seeds, allowing the seeds to stand until of uniform moisture content, crushing the tempered seeds between rolls to produce flakes, and then drying the flakes at a temperature below that at which the gelatinous forming property of the seeds is impaired.

6. A process of preparing psyllium seeds for physiological consumption, which consists in tempering the seeds by adding water thereto to increase the moisture content of the seeds without bringing out the gelatinous content of the seeds, allowing the seeds to stand until of uniform moisture content, crushing the tempered seeds between rolls to produce flakes, and adding to the flakes flavoring material.

7. A method of preparing a laxative of gelatinous forming seeds for physiological consumption, including the steps of subjecting the seeds to the action of crushing rolls to produce large thin flakes, adding finely divided phenolphthalein to the flakes, subjecting the mixture to moisture to incorporate the phenolphthalein in the flakes, and then drying the flakes at a temperature below that at which the gelatinous forming property of the seeds is impaired.

8. A method of preparing a laxative of gelatinous forming seeds for physiological consumption, including the steps of subjecting the seeds to the action of crushing rolls to produce large thin flakes, adding a finely divided laxative compound to the flakes, subjecting the mixture to moisture to incorporate the laxative compound in the flakes, and then drying the flakes at a temperature below that at which the gelatinous forming property of the seeds is impaired.

9. A method of preparing gelatinous forming seeds for physiological consumption, including the steps of subjecting the seeds to the action of crushing rolls to produce large, thin flakes, adding flavoring matter to the flakes, subjecting the flakes and flavoring matter to the action of moisture, and then drying the flakes at a temperature below that at which the gelatinous forming property of the seeds is impaired.

10. A process of preparing gelatinous forming seeds for physiological consumption, including the steps of tempering the seeds to a predetermined moisture content, adding flavoring matter to the seeds, subjecting the seeds to the action of crushing rolls to produce flakes, and then drying the flakes at a temperature below that at which the gelatinous forming property of the seeds is impaired.

11. A laxative auxiliary physiological product consisting of flakes of psyllium seeds or other seeds having the property of producing with moisture a gelatinous or mucilaginous material consisting of flakes of said seeds, the surface area of which is from three to fifteen times that of the seeds, and including the hull in disrupted, thin, pliant particles, and the crushed endosperm of the seeds.

12. A laxative auxiliary physiological flake of psyllium seed consisting of particles of the psyllium seed rolled in flakes and dried and retaining the endosperm and the hull of the seed with its property of forming a gelatinous or mucilaginous material with moisture unimpaired, and its hull in disrupted, thin, pliant particles.

13. A laxative auxiliary physiological flake of psyllium seed consisting of dried particles of psyllium seeds rolled in flakes, and flavoring matter, and retaining the endosperm and the hull of the seed with its property of forming gelatinous or mucilaginous material with moisture unimpaired, and its hull in disrupted thin, pliant particles.

14. A laxative auxiliary physiological flake of psyllium seed consisting of dried particles of psyllium seed, flavoring matter, and a laxative material in flakes, and retaining the endosperm and the hull of the seed with its property of forming a gelatinous or mucilaginous material with moisture unimpaired, and its hull in disrupted thin, pliant particles.

THOMAS W. HALLIDAY.